(12) United States Patent
Born et al.

(10) Patent No.: US 10,957,173 B1
(45) Date of Patent: Mar. 23, 2021

(54) SYSTEM AND METHOD FOR PROVIDING AND/OR COLLECTING INFORMATION RELATING TO OBJECTS

(71) Applicant: SAP SE, Walldorf (DE)

(72) Inventors: Torsten Born, Altlussheim (DE); Volker Obry, Neustadt Weinstrasse (DE); Dominic Yow-Shin-Cheung, Wiesloch (DE); Sebastian Netuschil, Heidelberg (DE); Nils Machner, Forst (DE); Denise Wildner, Munich (DE); Anja Wilbert, Munich (DE); Pierre Fritsch, Karlsruhe (DE); Ketaki Raut, Munich (DE); Sabrina Regler, Munich (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/722,934

(22) Filed: Dec. 20, 2019

(30) Foreign Application Priority Data

Dec. 4, 2019 (EP) ..................................... 19213502

(51) Int. Cl.
*G08B 13/24* (2006.01)

(52) U.S. Cl.
CPC ....... *G08B 13/2417* (2013.01); *G08B 13/242* (2013.01); *G08B 13/246* (2013.01); *G08B 13/2462* (2013.01)

(58) Field of Classification Search
CPC combination set(s) only.
See application file for complete search history.

(56) References Cited

U.S. PATENT DOCUMENTS 9,218,515 B2    12/2015  Niedermeyer et al.
2013/0282533 A1*  10/2013  Foran-Owens .... G06Q 30/0641
                                                    705/27.1

(Continued)

FOREIGN PATENT DOCUMENTS

WO    2015/0044771 A1    1/2015

OTHER PUBLICATIONS

"Extended European Search Report", European Patent Office, dated Feb. 20, 2020 (Feb. 20, 2020), for European Application No. 19213502.8-1213, 7pgs.

*Primary Examiner* — Thomas S McCormack
(74) *Attorney, Agent, or Firm* — Buckley, Maschoff & Talwalkar LLC

(57) ABSTRACT

A system for providing and/or collecting information relating to at least one object is provided. The system comprises a radio-frequency identification, RFID, tag that is provided proximate to the at least one object, the RFID tag being configured to enable detection of a position and/or a movement of the at least one object; a server device configured to receive position and/or movement data about the at least one object; and a mobile device configured to: identify the at least one object; send a request to the server device for object information about the identified at least one object; wherein: the server device is further configured to, in response to the request, provide to the mobile device targeted object information about the identified at least one object, the targeted object information being at least partially based on the position and/or movement data; and the mobile device is further configured to display the targeted object information.

17 Claims, 7 Drawing Sheets

(56) References Cited

U.S. PATENT DOCUMENTS

| | | | |
|---|---|---|---|
| 2014/0207615 A1* | 7/2014 | Li | G06O 30/0623 |
| | | | 705/26.61 |
| 2016/0093182 A1 | 3/2016 | Turgeon et al. | |
| 2018/0096331 A1* | 4/2018 | Patil | G07G 1/009 |
| 2019/0147393 A1* | 5/2019 | McCafferty | G06Q 30/0208 |
| | | | 340/572.1 |
| 2019/0220844 A1 | 7/2019 | Trivelpiece et al. | |

* cited by examiner

SYSTEM AND METHOD FOR PROVIDING AND/OR COLLECTING INFORMATION RELATING TO OBJECTS

CROSS-REFERENCE TO RELATED APPLICATIONS

The present application claims priority under 35 U.S.C. § 119(a) to EP Patent Application No. 19213502.8, filed Dec. 4, 2019, the contents of which are incorporated herein by reference for all purposes.

DESCRIPTION

Technical Field

The following description relates to a system and method for providing and/or collecting information relating to objects, in particular objects within a store.

More specifically, the application relates to collecting user and object movement data as well as providing object information based at least partially thereon.

Background

In the last decades the supply offered by real-world stores has constantly increased, especially with the progressive disappearance of small businesses. The size of the stores and the number of customers make it challenging, on one hand, to provide an effective shopping experience to the customers. On the other hand, the store owners also struggle to obtain feedback about the products.

SUMMARY

It is an objective of the invention to effectively collect and/or provide information in the context of a real-world shopping experience.

The achievement of this objective in accordance with the invention is set out in the independent claims. Further developments of the invention are the subject matter of the dependent claims.

According to one aspect, a system for providing and/or collecting information relating to at least one object is provided. The system comprises:
a radio-frequency identification, RFID, tag that is provided proximate to the at least one object, the RFID tag being configured to enable detection of a position and/or a movement of the at least one object;
a server device configured to receive position and/or movement data about the at least one object; and
a mobile device configured to:
identify the at least one object;
send a request to the server device for object information about the identified at least one object;
wherein:
the server device is further configured to, in response to the request, provide to the mobile device targeted object information about the identified at least one object, the targeted object information being at least partially based on the position and/or movement data; and
the mobile device is further configured to display the targeted object information.

As used herein, the term 'object' is understood as indicating a physical item, such as a product on display in a shop, e.g. on a shelf or on the floor, depending on the size. Further, the object may be enclosed in a box, wrapped or otherwise covered and/or encased, and in the following the term 'object' may be used by extension to denote the combination of the actual object and its container/cover as well.

The system may provide and/or collect information for a plurality of objects that are available or could be available within a given environment. The environment may be indoor or outdoor or a combination of both, it may be distributed across different physical locations (e.g. branches) or be at a single location, it may comprise one or more unities (e.g. rooms and/or floors).

As used herein, the term proximate may refer to a physical relationship that includes being at, on, and near. Exemplarily, the RFID tag may be attached directly to the object, e.g. by means of an adhesive, or it may be connected to the object by other means, e.g. by fastening means. The link between the object and its RFID tag is such that the position of the object can be approximated with the position of the RFID tag for the purposes of this disclosure.

In the case of a plurality of objects, each object may be provided with an RFID tag.

Conventionally, the RFID tag comprises an antenna for wirelessly transmitting and/or receiving radio-frequency signals and analog and/or digital electronics operatively connected thereto, which are generally implemented as a chip. The RFID tag typically can store and communicate data that uniquely identify an object, e.g. a unique identifier. The RFID may be active or passive.

The RFID tag of the system above is further configured to enable detection of a position and/or a movement of the object. More precisely, the RFID tag is configured to enable detection of its own position and/or movement. However, as noted above, in view of the connection between the object and the RFID tag, the position of the RFID tag (as well as its change with time, i.e. movement) is considered equivalent to the position of the object.

By 'position' a place occupied by the object in space at a given time is meant. The position of the object may e.g. be described by values for three coordinates relative to a coordinate system, if the object is approximated to a point. The detection of the position of the object may entail pinpointing the position of the object within a given error margin depending on the technology used and/or determining whether the object is within a predefined volume of space. Accordingly, corresponding position data may comprise the object coordinates and/or a binary indication (yes/no) about whether the object is within a given area.

The RFID tag can enable detection of the position by communicating with one or more RFID readers located in the environment. Alternatively or additionally, the RFID tag may be enhanced with a position component, e.g. the RFID tag may comprise a Bluetooth beacon that can communicate with one or more Bluetooth devices. Accordingly, the system may comprise detection devices configured to interact with the RFID tag in order to enable detection of a position of the object.

"Movement" should be understood as a change in the position of the object with time, e.g. due to an action of a user, such as lifting up the object from a shelf. The RFID tag may comprise one or more motion sensors, e.g. a magnetometer and/or an accelerometer and/or a gyroscope. The RFID chip may comprise additional components, such as a communication unit and/or a processing unit, in order to receive/send and optionally process the movement data collected by the sensor(s).

According to the above features, position and/or movement data about one or more objects can be efficiently and effectively collected.

The server device may be implemented as a server computer having at least a communication unit, e.g. a wireless communication unit, configured to receive the position and/or movement data collected thanks to the RFID tag. In particular, the server device may receive the data from any source device, such as the RFID tag and/or from other devices such as RFID readers or Bluetooth devices. The data received by the server device may have been already pre-processed at the source device and/or may be processed by the server device after receipt.

The mobile device may be e.g. a smartphone or a tablet. The mobile device identifies the at least one object and sends a request to the server device for object information about the identified at least one object. The mobile device may be equipped with hardware (e.g. a camera, Wi-Fi/Bluetooth components . . . ) and software (e.g. one or more application programs) for providing the various functionalities. The actions of the mobile device of identifying the object and sending the request may be performed upon receipt of an input by user.

Exemplarily, the mobile device may identify an object by scanning the object with a camera and recognizing the object, e.g. on the basis of recorded reference objects. In another example, the mobile device may identify an object by reading e.g. with a camera information printed on the RFID tag (such as a QR code) and/or establishing communication with a Bluetooth-equipped RFID tag. In other words, a recognition/identification of the object may be based on data extracted/received from the RFID tag.

The mobile device may send the request to the server device for object information about the identified object e.g. via wireless communication. Exemplarily, the request may be sent by an application program on the mobile device. The request may include identification data of the identified object.

The object information (which may also be referred to as "object data") comprises any data related to the one or more objects, such as data describing the object (e.g. technical characteristics, physical features . . . ), data associated with the object (e.g. brand, price, use and/or care instructions . . . ), data about other objects similar and/or complementary to the given object (e.g. type of batteries for a battery-powered device), data about actions that can be performed in relation to the object within the environment (e.g. test, order, purchase).

The server device receives the request and, in response to it, provides targeted object information based at least partially on the position and/or movement data.

The targeted object information may be a subset of the object information about a given object, in particular a proper subset, i.e. it contains only a part of the data available about the object. The choice of which data to provide is made, at least partially, depending on the position and/or movement data. In other words, the position and/or movement data influence and/or determine the targeted object information. The targeted object information may also further comprise object information not determined by the position and/or movement data.

In one example, if the server device has received movement data according to which the object has been lifted, it may select information about one or more other objects needed in combination with the identified object for its functioning (e.g. a secure digital, SD, card for a camera or a light bulb for a lamp).

In another example, if the server device has received position data that the object is in the proximity of a check-out counter, it may select information about check-out. In other words, the position and/or movement data may comprise an indication that the at least one object is located in a check-out area and the targeted object information may comprise indications about a check-out action, e.g. that check-out via the mobile device is possible, final price of the object etcetera. Exemplarily, the mobile device may be further configured to elicit a payment of the at least one object, e.g. by displaying a payment prompt and/or a link to an application for paying, and, thus, allow a user to make the payment. The paying functionality may be provided by the server device.

In some examples, the position and/or movement data may be "negative" data, i.e. data indicating that there has been no movement and/or indicating that an object is not at a certain position/within a certain area.

The targeted object information may be retrieved from a source, such as an object information database, and/or may be created by the server device. The object information database may support any database model, e.g. it may be a relational database. For example, given position and/or movement data may be associated with respective existing pieces of information, such as "position in the check-out area" "indications about check-out". In other words, there may be existing rules on how to select the targeted object information from available object information, e.g. in the form of conditional statements applied at the server device. Additionally or alternatively, the server device may be configured to generate targeted object information on the basis of the received position and/or movement data, e.g. using data analysis and/or machine learning. The server device may also make use of the existing object information in order to generate targeted object information.

Thanks to the features discussed above, object information can be provided efficiently and effectively.

The server device may store the received position and/or movement data and perform analysis on the position and/or movement data, so that the targeted object information may be based on a plurality of datasets, e.g. datasets received at different points in time. In other words, exemplarily, the server device may be configured to store the position and/or movement data and to analyze and/or process the position and/or movement data.

A common functionality of RFID tags is theft prevention, in that e.g. the RFID tag is activated by a radio signal emitted by a radio transmitter placed next to the exit of the shop. Once activated, the RFID tag emits a radio signal in response and a radio receiver also placed in proximity of the exit of the shop receives the signal and triggers an alarm, possibly depending on the frequency of the signal or other factors.

According to one example, the mobile device may be further configured to, if the payment of the at least one object has been made, cause the theft prevention function of the RFID tag to be disabled. Exemplarily, after successful payment, the mobile device may communicate to the server device the unique identifier of the RIFD tag relative to the paid object and the server device may mark the object as paid and "whitelist" it for alarm triggering. In particular, the server device may store the unique identifier in a data structure configured to contain identifiers of paid objects. The server device may be in communication with the radio receiver and e.g. override the generation of an alarm signal if the unique identifier of the detected RFID tag is whitelisted.

Receiving the unique identifier from the mobile device may in itself be an indication that the associated object has been paid for. Alternatively, the mobile device may e.g. send, together with the unique identifier, an additional piece of information, such a flag, indicating that the payment has been made.

If the user, after leaving the establishment, comes back with the same product having the RFID tag still affixed to it, the user may receive additional information about e.g. services and/or objects related to the product.

The server device sends the targeted object information to the mobile device, which displays it. For example, the mobile device may show the targeted object information overlaid with the object and/or its environment in an augmented reality context. The targeted object information may be provided in the form of text and/or images and/or audio, with the possibility of interaction on the side of a user of the mobile device. The targeted object information may be displayed all at once or at different points in time, e.g. as a result of interactions with the user.

For example, the user may choose at least partially how/what to visualize. In another example, the user may provide feedback on the displayed targeted object information. In yet another example, the displayed targeted object information may enable the user to interact with the server device, e.g. accessing other applications. The mobile device may comprise a graphical user interface (GUI) to enable user interaction.

According to an example, the targeted object information comprises a route from the at least one object to a secondary object and the mobile device is further configured to provide real-time guidance along the route.

In particular, the identified object may be an object that is related to one or more other objects, or secondary objects, e.g. it must or can be used in combination with the one or more secondary objects, or it is often bought together with the one or more secondary objects. The targeted object information may, thus, comprise details about the secondary object, including a location of the secondary object in the environment, e.g. a store, and a route or path leading from the identified object to the secondary object. The route is a sequence of positions between a starting position and an end position.

The mobile device receives the route data and provides a navigation aid along the route. The mobile device can measure its own position in real time within the environment using different techniques, such as using the signal strength of Bluetooth signals from beacons or of Wi-Fi signals from hotspots placed in the environment. In some examples, the detection devices that interact with the RFID tags may also interact and/or communicate with the mobile device in order to determine the position of the mobile device.

Exemplarily, the mobile device may compare its actual position to the positions according to the route data and provide visual or audio indications to a user of the mobile device. For instance, the route may be displayed within an augmented reality context, with the real environment being captured by a camera of the mobile device and navigation aid information such as arrows overlaid on it. Accordingly, the mobile device can lead the user efficiently to the secondary object.

Additionally, the mobile device may be further configured to provide additional information about one or more additional objects located along the route. Indeed, other objects may be located on the route from the identified object to the secondary object of interest, and the server device may send data about these objects, such as special discount information, besides the route data. The server device may send the additional information together with the route data and the mobile device may provide them to a user, e.g. displaying them, at predetermined times during the route. Alternatively, the server device may track a position of the mobile device, e.g. by receiving the position from the mobile device itself, and may send data relating to an object along the route when the mobile device is in proximity of that object.

As mentioned, the system may provide and/or collect information relating to a plurality of objects located in an environment. In other words, the at least one object may comprise a plurality of objects. The server device may be further configured to store the position and/or movement data about the plurality of objects and process the position and/or movement data to obtain values of aggregate indicators relative to a predefined amount of time.

For example, the server device may receive position and/or movement data at a plurality of times. The RFID tag and/or other detection devices may send position and/or movement data when a change is detected and/or at predetermined intervals, wherein the intervals may have equal or different durations. The server device may store the position and/or movement data for each object, e.g. in the object information database and/or in another storage.

The stored data may then be used to compute aggregate indicators relative to a given amount of time. In other words, all data acquired within the given amount of time for a specific object may be combined to obtain a quantitative indicator about interactions of users with the object. Data relating to more objects can also be combined. The data collected over the given amount of time are processed to extract values of aggregate indicators, which are quantities that provide indications about the object(s).

For example, every time an object is moved e.g. lifted, a counter value may be increased: the cumulative value of the counter over the given amount of time may be an aggregate indicator value. In another example, every time an object is moved to a check-out area, a counter value may be increased. If more objects are nominally identical to each other, such as examples of the same product, the counter value may be increased each time one of the identical objects is moved to the check-out area. The corresponding indicator may then be associated with each of the identical objects.

The system may further comprise an additional mobile device configured to display the values of the aggregate indicators superimposed on a spatial representation of the environment. The additional mobile device may be a mobile device belonging to e.g. a store owner. An application that is not available to users of the (first) mobile device, e.g. customers, may be installed on the additional mobile device in order to provide the functionalities discussed below.

Each object may be associated with a prescribed location within the environment, which is the location where the object is positioned by default, e.g. by the store owner or an employee, and where it is supposed to be so that it can be found, e.g. by a customer. If there is an aggregate indicator associated with the object, the value of the aggregate indicator may be shown at the location of the object within the spatial representation of the environment, such as a map of a store.

The value may be shown as a number ("100") at the prescribed location of the object, and/or may be shown using color, such as a colored dot overlaid on the spatial representation at the prescribed location. In particular, if a given aggregate indicator is seen as a variable of the plurality of objects, the areas of the spatial representation may be colored e.g. shaded in proportion to the value of the indicator. Different colors and/or different shades (e.g. with different intensity) of the same color may be associated with different values or values ranges of the indicator, thereby providing a heat map or Choropleth map. Accordingly, the values may be displayed directly or in an indirect manner that requires a legend to be interpreted.

Another aspect of the present invention relates to a computer-implemented method for providing and/or collecting information relating to at least one object, the method comprising:

providing the at least one object with a radio-frequency identification, RFID, tag that enables detection of a position and/or a movement of the at least one object;

detecting the position and/or the movement of the at least one object;

receiving, by a server device, position and/or movement data about the at least one object;

identifying, by a mobile device, the at least one object;

sending, by the mobile device, a request to the server device for object information about the identified at least one object;

providing, by the server device, targeted object information about the identified at least one object to the mobile device, the targeted object information being at least partially based on the position and/or movement data; and displaying, by the mobile device, the targeted object information.

It should be noted that the execution of the steps of the method does not necessarily follow the order in which they are listed above and at least some steps may be repeated.

For example, after displaying the targeted object information, further targeted object information may be provided by the server device, which is in turn again displayed and so on. Further, the position and/or movement may be detected again after displaying the targeted object information, so that new position and/or movement data may be sent to the server device. Accordingly, the server device may provide new targeted object information, which is subsequently displayed.

In another example, the object may be identified and the request for object information may be sent before position and/or movement is detected and corresponding data are received.

In an example, displaying, by the mobile device, the targeted object information may comprise using augmented reality.

In an example, the position and/or movement data may comprise an indication that the at least one object is located in a check-out area and the targeted object information may comprise indications about a check-out action. Furthermore, the RFID tag may provide a theft prevention function and the method may further comprise eliciting, by the mobile device, a payment of the at least one object; and, if the payment of the at least one object has been made, disabling the theft prevention function of the RFID tag.

In an example, the targeted object information may comprise a route from the at least one object to a secondary object and the method may further comprise providing, by the mobile device, real-time guidance along the route. Furthermore, the method may additionally comprise providing, by the mobile device, additional information about one or more additional objects located along the route.

In an example, the at least one object may comprise a plurality of objects located in an environment and the method may further comprise:

storing, by the server device, the position and/or movement data about the plurality of objects;

processing, by the server device, the position and/or movement data to obtain values of aggregate indicators relative to a predefined amount of time; and displaying, by an additional mobile device, the values of the aggregate indicators superimposed on a spatial representation of the environment.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
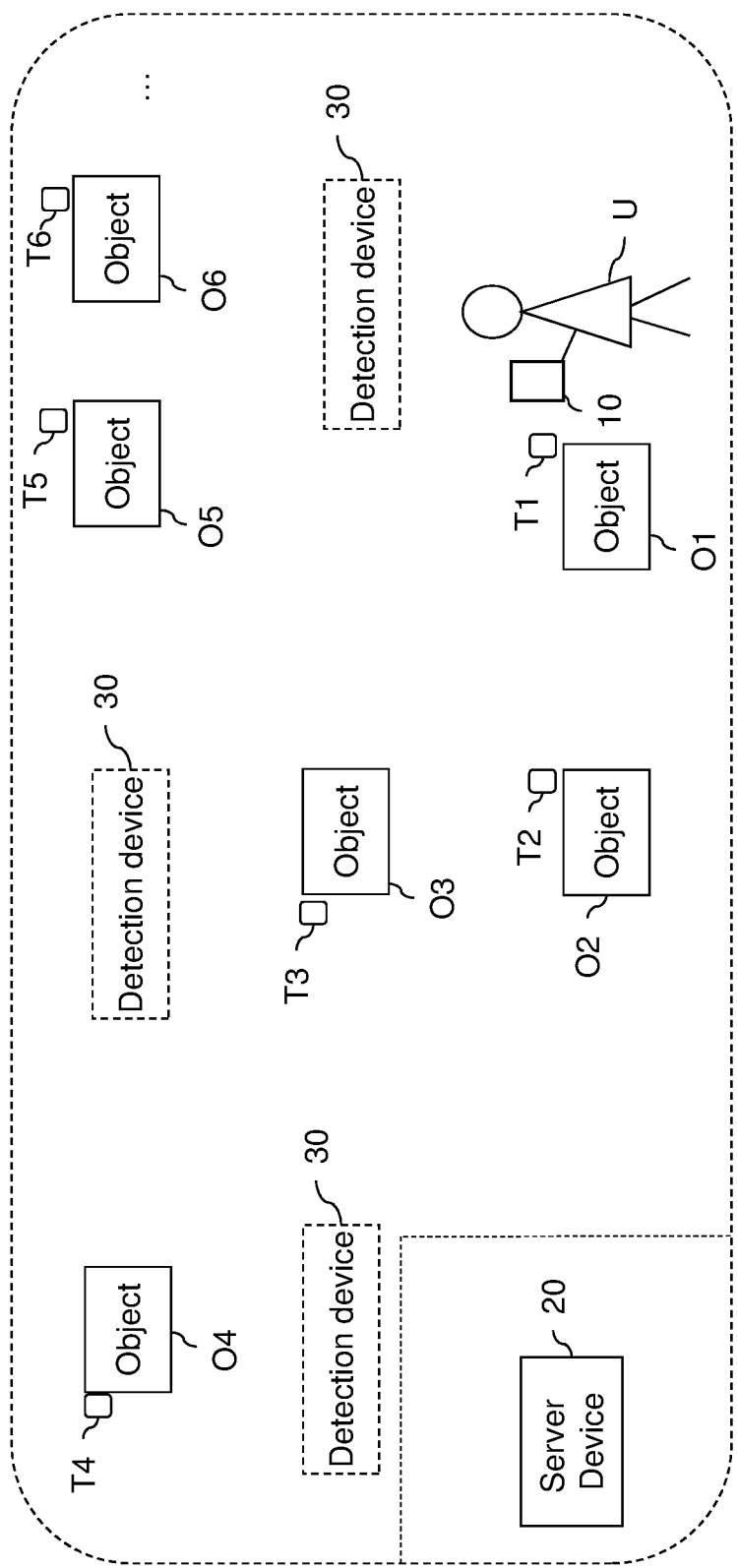
FIG. 1 shows an exemplary setup of a system according to the present disclosure.

FIG. 1 shows an exemplary setup of a system according to the present disclosure. In the exemplary setup shown in FIG. 1, objects O1, O2, . . . (hereinafter, collectively referred to as "objects O" or, in case of referring to one of the objects, as "object O") are provided at different physical locations in a certain environment. In this example, the environment may be at least part of a shop or store or showroom where certain products are sold. Further, in this example, the objects O may be the products sold in the environment.

In the example of FIG. 1, tags T1, T2, . . . (hereinafter, also collectively referred to as "tags T" or, in case of referring to one of the tags, as "tag T") are provided proximate to the objects O. For instance, at least one of the tags T may be attached and/or linked in any other way (e.g. with fastening means) to the corresponding object O.

In some examples, the tags T may be RFID (radio-frequency identification) tags. In some cases, the RFID tags may be passive RFID tags that are activated by radio energy transmitted by an RFID reader. The tags T can enable detection of a position and/or a movement of the object O to which the tag T is affixed.

The RF technology of the RFID tag can be used for position detection, but alternatively or additionally a Bluetooth beacon such as Puck.js may be integrated in the tag T. If triangulation and/or trilateration is used to determine the position of the tag T and, consequently, of the object O to which the tag T is affixed, at least three detection devices 30 may be part of the system. Depending on the size of the environment and the range of the technology used for position detection, a plurality of triplets of detection devices 30 may be used, wherein triplets may have common elements. The detection devices 30 may be RFID readers and/or Bluetooth devices that can receive Bluetooth signals, e.g. Bluetooth Low Energy (BLE) signals.

In order to allow for movement detection, the tag T may comprise a magnetometer, which is also part of the Bluetooth beacon Puck.js, and/or a gyroscope and/or an accelerometer.

It should be noted that the number of the objects O and the corresponding tags T provided in the environment may be more than or less than that shown in FIG. 1. Further, the locations of the objects O and the optional detection devices 30 as shown in FIG. 1 serve only illustrative purposes and do not necessarily correspond to real locations.

In the example of FIG. 1, the user U (e.g., a customer) may carry a mobile device 10. The mobile device 10 may be configured to identify at least one object O. In case the user U is interested in an object O, the user U may instruct the mobile device 10 to obtain information corresponding to the identified object O. The mobile device 10 may send a request for information to a server device 20 via a wireless network (not shown).

The server device 20 may be provided within the environment or at a different location outside the environment, e.g. remotely from the environment. The server device 20 may comprise one or more server applications may be configured to receive, process and/or provide the data concerning the one or more objects O. The server device 20 may be in communication with an object information database 40 storing object information. The server device 20 may further communicate via a wireless network with the tags T and/or the detection devices 30, in order to receive position and/or movement data. The server device 20 may store and/or analyse the position and/or movement data.

The server device 20 may retrieve targeted object information from the object information database about an object O in response to the request of the mobile device 10, wherein the targeted object information is chosen at least partially based on the position and/or movement data. Alternatively or additionally, the server device 20 may generate targeted object information. The server device 20 may then transmit the data constituting the targeted object information to the mobile device 10.

Exemplarily, the server device 20 may be run via a cloud provider e.g. by using a platform like Kyma.

The mobile device 10 may display the targeted object information received from the server device 20, for instance by using augmented reality.

Figure 2:
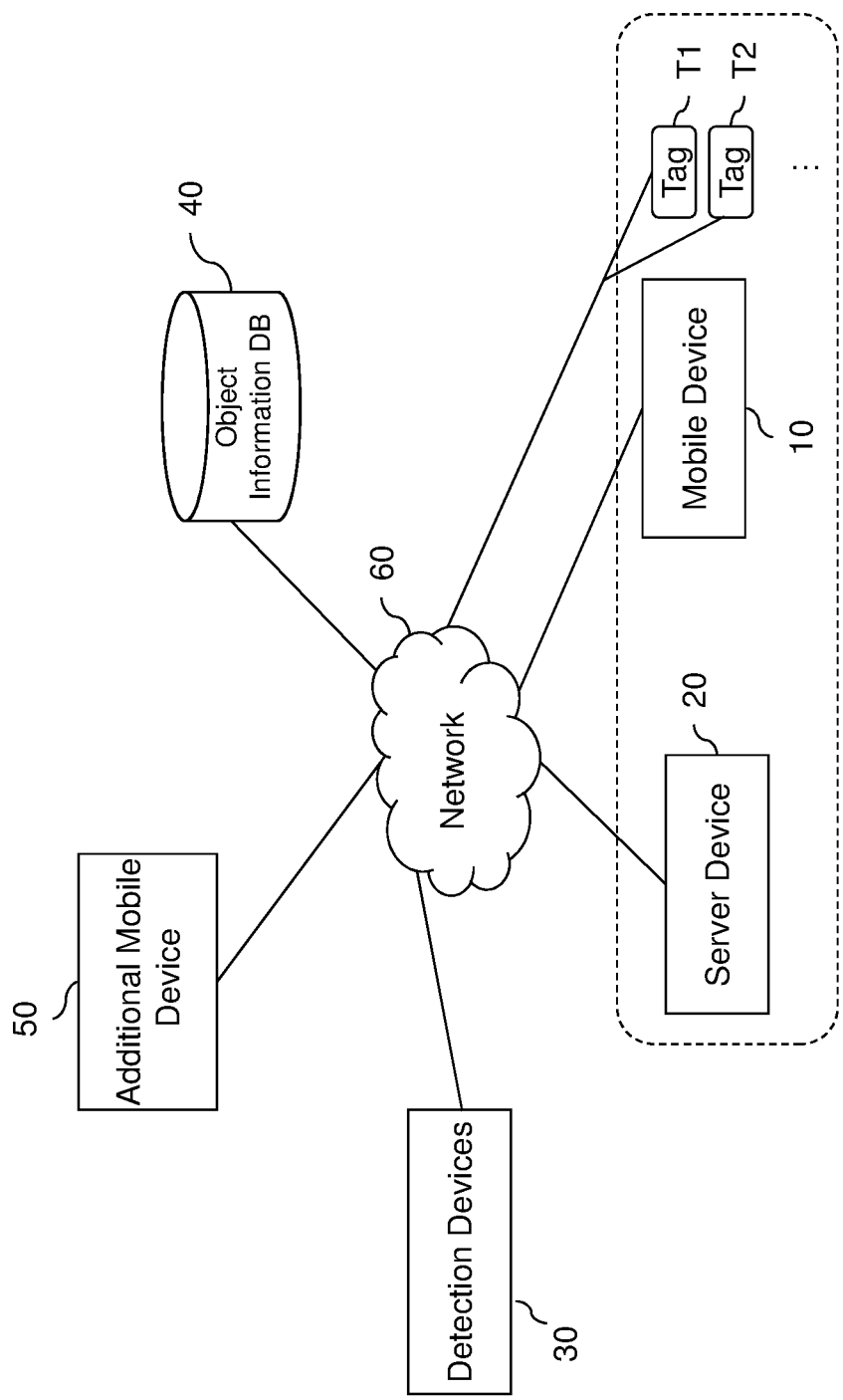
FIG. 2 shows an example of the system according to the present disclosure.

FIG. 2 shows an example of the system according to the present disclosure. As also stated above with reference to FIG. 1, the system shown in FIG. 2 may comprise the tags T, the mobile device 10 and the server device 20. The mobile device 10, the tags T and the server device 20 may be connected via the network 60. The network 60 may include the Internet and/or one or more intranets. Further, at least part of the network 60 is implemented by a wireless network (e.g. wireless local area network (WLAN), cellular network, etc.).

The exemplary system shown in FIG. 2 may further comprise detection devices 30, an object information database (DB) 40 and an additional mobile device 50, which may be connected to the network 60. The details of these devices will be described later below with reference to FIG. 3.

Figure 3:
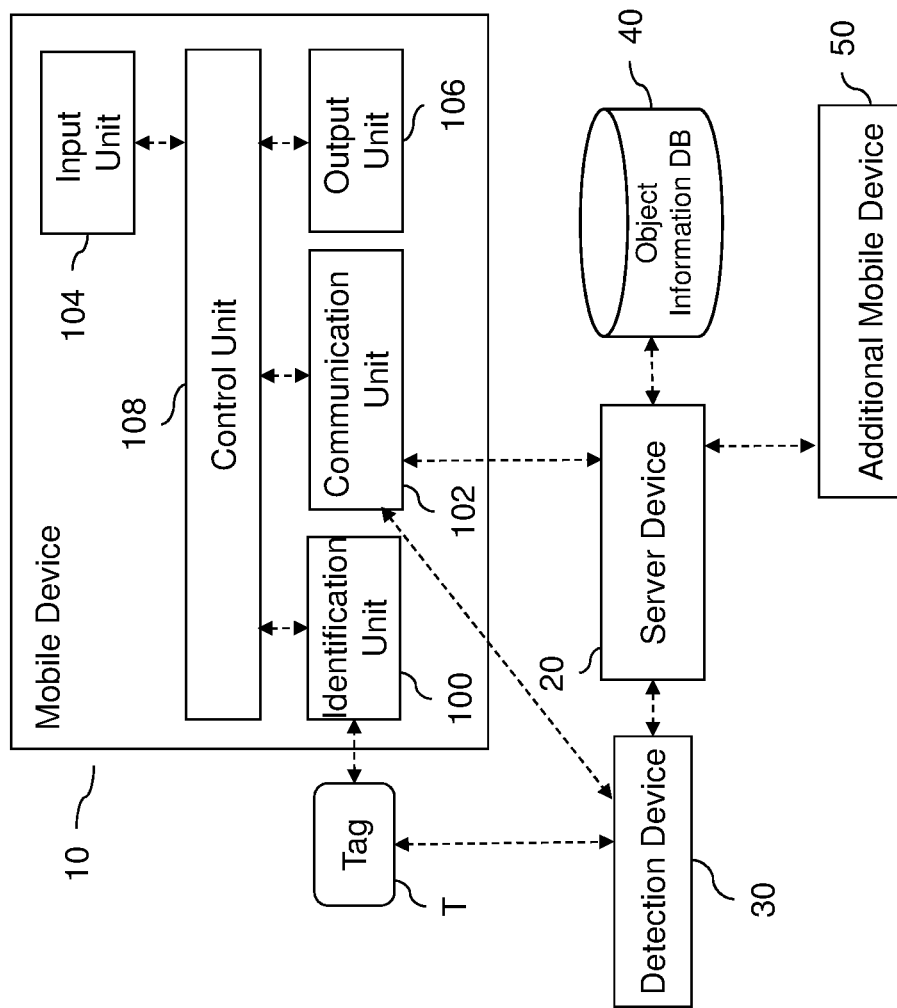
FIG. 3 shows an exemplary functional block diagram of the system according to the present disclosure.

FIG. 3 shows an exemplary functional block diagram of the system according to the present disclosure. As shown in FIG. 3, the mobile device 10 may comprise a identification unit 100, a communication unit 102, input unit 104, output unit 106 and a control unit 108.

The communication unit 102 may be an interface for communicating with other devices such as the server device 20. The communication unit 102 may be implemented by, for example, a network interface that enables communication via a wireless network, such as Bluetooth or Wi-Fi.

The identification unit 100 may be configured to identify an object O. The identification unit 100 may be implemented by a device that is suitable for identifying an object O, depending on the technology used for the identification. For example, the identification unit 100 may be a camera configured to capture an image of the object O. In other examples, the identification may be based on the tag T affixed to the object O. For instance, the tag T may comprise computer-readable code (such as barcode or QR code etc.) and/or human-readable code, so that the identification unit 100 may be a camera or another reader device (e.g. QR code reader or optical character recognition (OCR) reader). In a further example, if the tag T has Bluetooth functionalities, the identification unit 100 may be part of the communication unit 102. The actual identification may further require specific software.

The input unit 104 may be configured to receive inputs from the user. The input unit 104 may comprise, for example, one or more switches (e.g., buttons) corresponding to one or more possible user instructions, which may be implemented by a touch panel displaying the switches. For instance, one of the switches may correspond to a user instruction to request object information, to purchase an object, to start navigation towards an object and other actions, some of which will be further described below. In particular, the input unit 104 may be the touch screen of a smartphone.

The output unit 106 may be configured to provide outputs. The output unit 106 may comprise, for example, a haptic output device, an audio output device and/or a display device. In some examples, the output unit 106 may provide an output presenting the received targeted object information, e.g. displaying the information on a display device. For instance, if the mobile device 10 provides real-time guidance along a route, in case the output unit 106 comprises a haptic output device (e.g., vibration motor), the output unit

106 may output different haptic effects to lead the user. Further, in case the output unit 106 comprises an audio output device, the output unit 106 may output different audio outputs providing indications about the route (e.g. 'turn left').

The control unit 108 may be configured to control the mobile device 10. The control unit 108 may be implemented by a processor and a memory, for example. The control unit 108 may be configured to control the identification unit 100, the communication unit 102 and the output unit 106 of the mobile device 10 to perform processing as described herein.

In some examples, the mobile device 10 may be implemented by a smartphone or a tablet computer, with one or more software applications that cause the device to perform the processes as described herein.

The additional mobile device 50 may include any of the elements described with reference to the mobile device 10.

The object information DB 40 may store object information for each object. The object information may be information relating to an object and may include but is not limited to, a default location of the object, rest in stock of the object, possible delivery dates of the object, promotions relating to the object, offerings relating to the object, cross sells relating to the object, bundles of the objects, etc.

The server device 20 may be implemented by a server computer. The server device 20 may be configured to provide, in response to a data request by the mobile device 10 and/or the additional mobile device 50, the information relating to the one or more objects of interest.

In some examples, the server device 20 may provide further application(s) which uses the information relating to the object(s) of interest selected by the user. For example, the server device 20 may provide an online shopping website from which the user may place purchase orders of the object(s) of interest selected by the user.

The tags T may be conventional security tags for products in a store, such as RFID tags, enhanced with additional functionalities that turn the products into self-managed products.

These additional functionalities may include, but are not limited to, position and/or movement detection and communication of position and/or movement data.

The detection devices 30 may be devices that interact with the tags T e.g. in order to determine a position of the tags T and, consequently, of the objects O. The detection devices 30 may also interact with the mobile device 10, in particular with the communication unit 102, in order to determine a position of the mobile device 10 and, consequently, of a user U holding the mobile device 10.

It should be noted that the system described above with reference to FIGS. 1 to 3 provides a mere example of the system according to the present disclosure and the system may have different configurations than the one shown in FIGS. 1 to 3.

Figure 4:
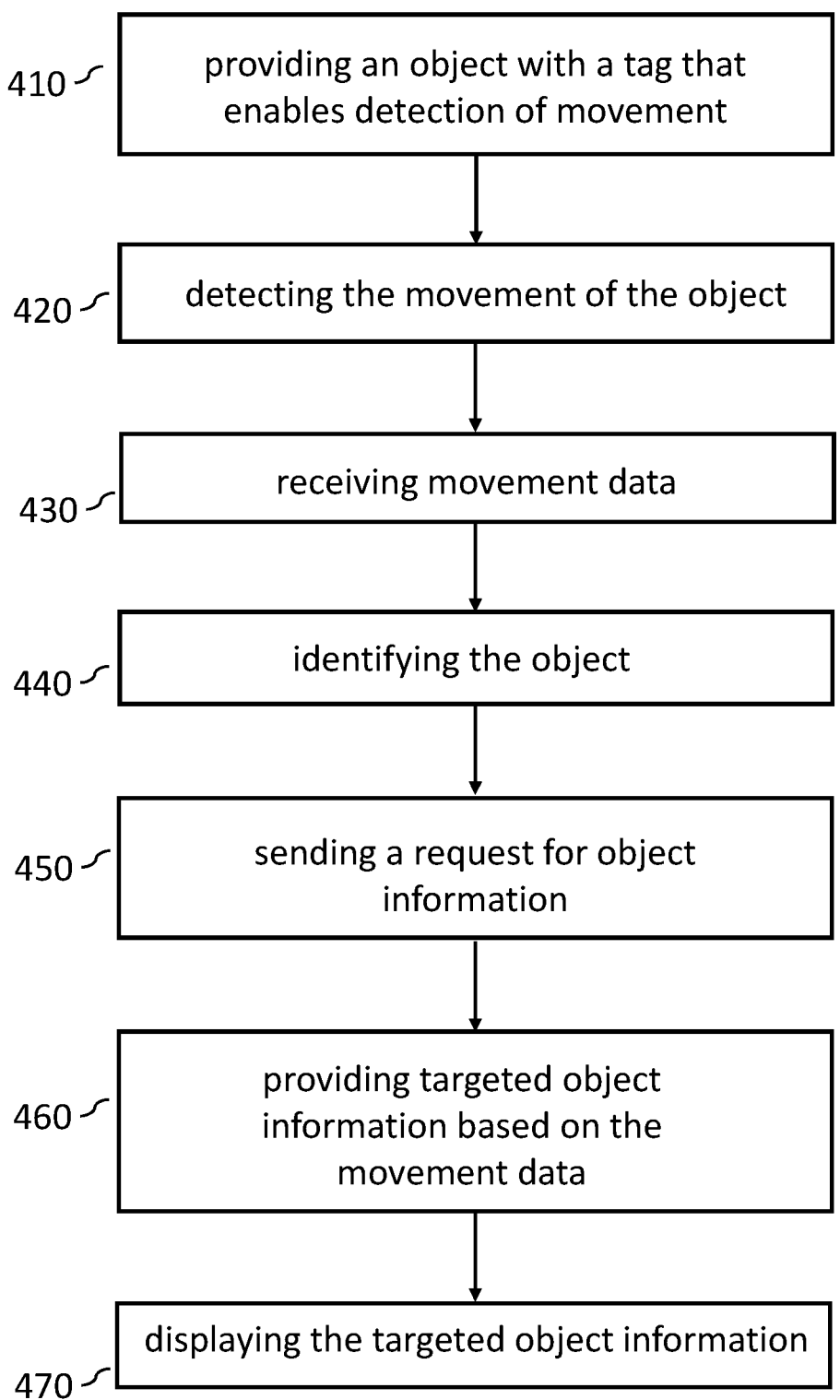
FIG. 4 shows a flowchart of an exemplary processing for providing and/or collecting information relating to one or more objects.

FIG. 4 shows a flowchart of an exemplary processing for providing and/or collecting information relating to one or more objects.

An example of an object O may be a camera that is provided at 410 with a tag T that comprises a motion sensor that can sense whether the object O and the tag T are moved, e.g. lifted from a shelf in a shop. The motion sensor may be a magnetometer and/or an accelerometer and/or a gyroscope. Further, the tag T may comprise a communication unit to transmit movement data. Exemplarily, the tag T may transmit movement data when a movement is detected.

A user U, such as a customer, may take the camera O off the shelf, thus triggering the detection of the movement (step 420) by the motion sensor in the tag T and the transmission of the movement data to the server device 20, which receives the data at 430. The server device 20 may store, keep track and analyze the movement data (e.g. using a software like Qualtrics), therefore recognizing that the camera has been lifted for the first time in a long time, e.g. no movement events have been detected over a predefined amount of time, such as 24 hours or seven days.

The customer U may be interested in learning more about the camera O and may use a mobile app on their mobile device 10 to check the details of the camera. For example, the customer U may capture a picture of the camera or its box with the mobile device 10 and a picture-recognition process may be performed, leading to the identification of the camera O at 440. The mobile device 10 may then send a request for information about the camera to the server device 20 at 450.

Once the server device 20 receives the request of the mobile device 10, based on the fact that the camera has been lifted for a first time in a long time, it may decide to offer a discount for the camera to the customer and so it generates a targeted piece of information about a 10% discount on the camera price, providing it to the mobile device 10 at 460.

The mobile device 10 may display a notification about the discount to the customer U at 470, wherein the notification may comprise an interactive feature, such as a button, that enables the customer to accept the discount.

Additionally or alternatively, at 460 the server device 20 may retrieve from the object information database 40 a list of accessories related to the camera, such as an SD card and a camera bag. The customer U may browse through the list displayed at 470 and select e.g. the SD card, upon which the server device 20 may inform the customer through the mobile device 10 at 470 that the SD card is currently not available in the store, and offer the customer U at 470 the opportunity of buying it online or ordering it and picking it up at the store in the next days. The customer U may select one of the options via a GUI on the mobile device 10.

The customer U may additionally or alternatively select the camera bag and the targeted object information provided at 460 and displayed at 470 may be a route to the camera bag, with an option for guiding the customer U to the location of the camera bag in the store. The customer may accept the offer and real-time guidance along a route to the shelf where the bag is located may be provided. For example, the mobile device 10 may capture pictures/video of the environment, i.e. the shop, while the customer U is moving among the shelves and use augmented reality to show the route e.g. as a line with arrows changing direction according the user movements.

Further, the server device 20 may provide at 460, while the route is being displayed at 470, additional information about objects along the route, such as special offers, which are also displayed (at 470).

Figure 5:
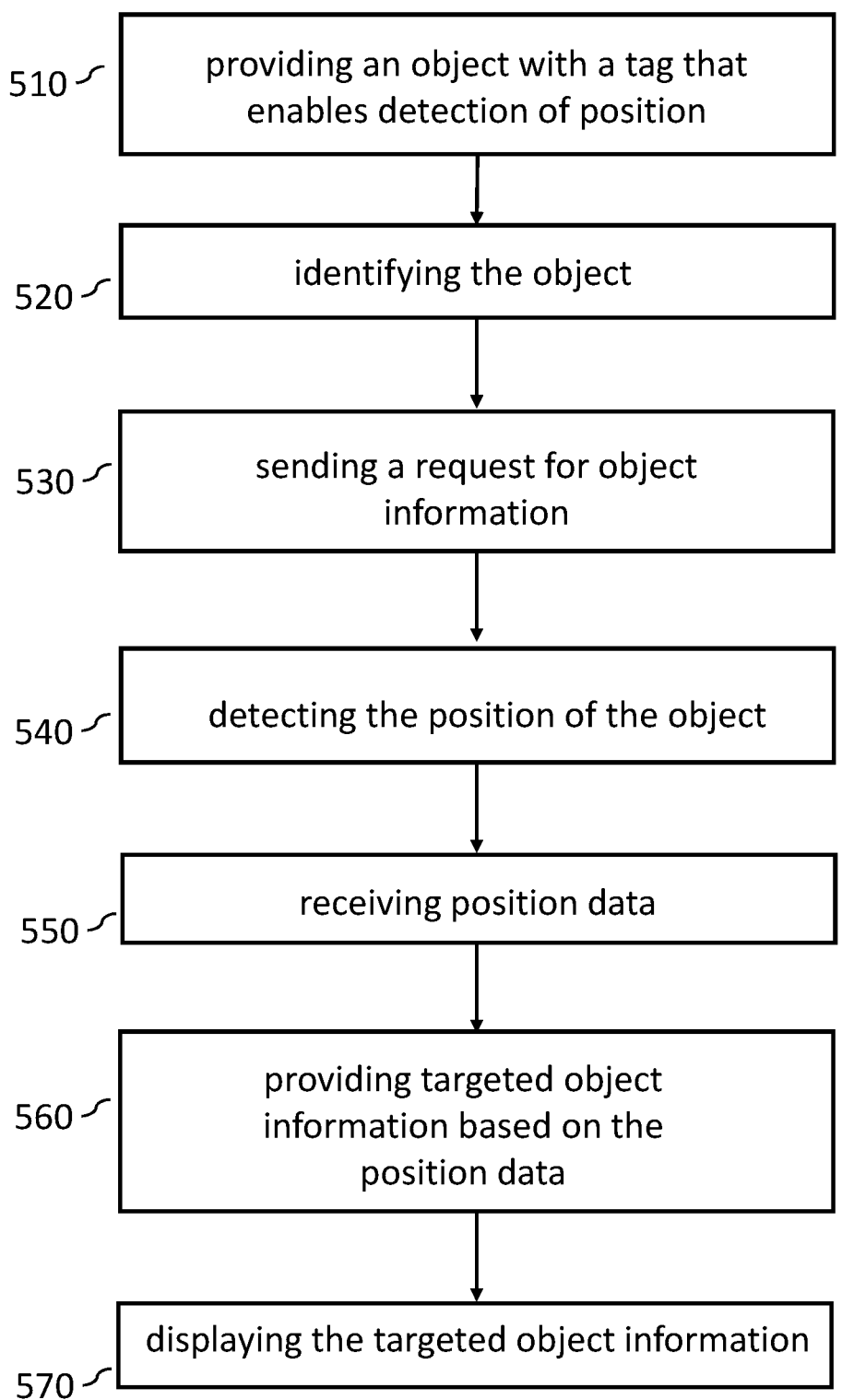
FIG. 5 shows a flowchart of another exemplary processing for providing and/or collecting information relating to one or more objects.

FIG. 5 shows a flowchart of another exemplary processing for providing and/or collecting information relating to one or more objects. The processing shown in FIG. 5 may be combined with the processing shown in FIG. 4 or may be independent from it.

An object O, such as a camera, may be provided at 510 with a tag T enabling detection of position, e.g. an RFID tag T. Further, the RFID tag may be used as an anti-theft measure.

A customer U may have considered buying the camera O and used their mobile device 10 to receive more information about the camera O, identifying the camera O at 520 e.g. by capturing an image, and sending a request for information about the camera O, such as technical specs, to the server device 20 at 530. The information may have been provided and displayed as discussed with reference to FIG. 4 above or according to other examples.

The customer U may then take the camera O, with the intention of purchasing it, and makes their way to the check-out counters. At least one RFID reader 30 may be located in proximity of a check-out area and may detect at 540 that the camera O is in the check-out area. The RFID reader 30 may communicate the position data relative to the camera O to the server device 20, which receives it at 550.

Based on the fact that the camera O is in the check-out area, the server device 20 may offer the customer U the possibility to check out by paying via the mobile device 10. Accordingly, at 560 the server device 20 may provide information relative to the check out and at 570 the mobile device 10 may display such information, which may include e.g. a link to an app for paying.

Once the customer U has paid, the mobile device 10 may disable the RFID tag so that the customer U can leave the store without triggering any theft alarms. For example, the RFID tag may be a RapiTag.

In the exemplary cases discussed above, information can be effectively collected and/or provided in the context of a real-world shopping experience. In particular, the collection of position and/or movement data is made effective thanks to the use of "smart" tags affixed to the products. Further, the provision of information about products is made effective by leveraging the collected position and/or movement data. The interplay between the mobile device 10, the server device 20 and the tags T makes the system efficient in terms of resource consumption and time. In particular, the real-time guidance to complementary items (e.g. batteries) is a guided human-machine interaction process that assists the user U in assembling a functioning product. The self-check-out prompted by a position of the items in a check-out area makes the check-out procedure more efficient and secure.

Figure 6:
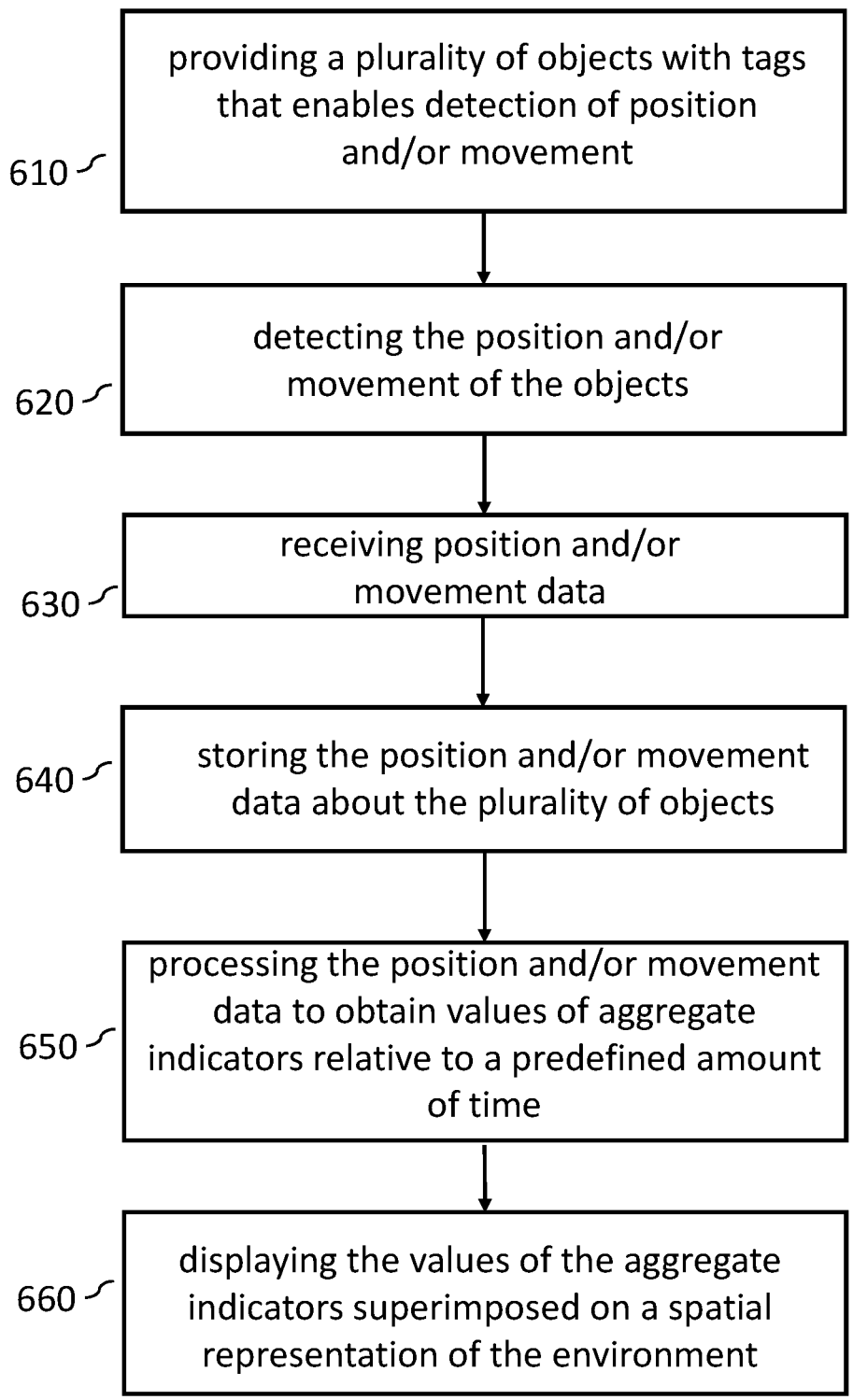
FIG. 6 shows a flowchart of yet another exemplary processing for providing and/or collecting information relating to one or more objects.

FIG. 6 shows a flowchart of yet another exemplary processing for providing and/or collecting information relating to one or more objects.

Retailers may not know what customers are looking at in their shops or showrooms. The retailers do not always have insights in how customers are experiencing the product assortment and what forms the interest of the customers. Further, the retailers might not have means to obtain real-time analytics data in a physical shop, store or showroom. Accordingly, a huge gap may exist between physical and online shopping experience.

The plurality of objects, e.g. products, O on display in a store may be provided with respective tags T, i.e. one tag T for each product O, at 610. The tags T may be such that they enable detection of position and/or movement, e.g. tags with Bluetooth beacons and accelerometers. The tags T themselves and/or in association with one or more detection devices 30 may detect the position and/or movement of the objects and the server device 20 may receive the position and/or movement data at 630.

The detection and reception may take place over time, at fixed intervals or based on given triggers. The server device 20 may store at 640 the position and/or movement data relating to the plurality of objects over the course of time. The stored data may be processed at 650 in order to obtain values of aggregate indicators relative to a predefined amount of time. For example, an aggregate indicator may indicate how many times an object has been lifted over 24 hours.

A user U, such as a store owner, may be interested in learning which products are more interesting for customers and may request this information to the server device 20 via their mobile device 50. The mobile device 50 may display, e.g. thanks to an app, the values of the aggregate indicators superimposed on a spatial representation of the shop, e.g. a map of the shop (at 660).

In particular, the mobile device 50 may display the values of the aggregate indicator using different shades of red, e.g. going from white to dark red, changing the ratio of the white/red components. The values of the aggregate indicator for the plurality of objects may be divided into intervals, and each interval may be associated to a specific shade of red. A pixel on the map of the shop corresponding to the standard location of an object may be displayed with a color corresponding to the value of the aggregate indicator for that object. Each pixel on the map may be accordingly color-coded, so that the layout of the shop is displayed in color and the shop owner U can see which areas of the shop and which objects are most sought after (e.g. smartphones→dark-red areas, objects lifted more than 100 times in 24 hours), as well as which ones attract less interest (e.g. DVDs→white areas, lifted less than 10 times in 24 hours).

The displayed informative map may allow for zooming in, so that a more refined understanding of the customer experience may be achieved.

Therefore, the position and/or movement data may enable real-time analytics for the physical retail space. This may lead to an improved customer support in-store due to better knowledge of the customers, to a more effective placement of the products in the store and to an optimized selection of which/how many items to provide in the store. Further, the examples of the system described above may be implemented in a store, shop or showroom with minimal invasive installation.

Figure 7:
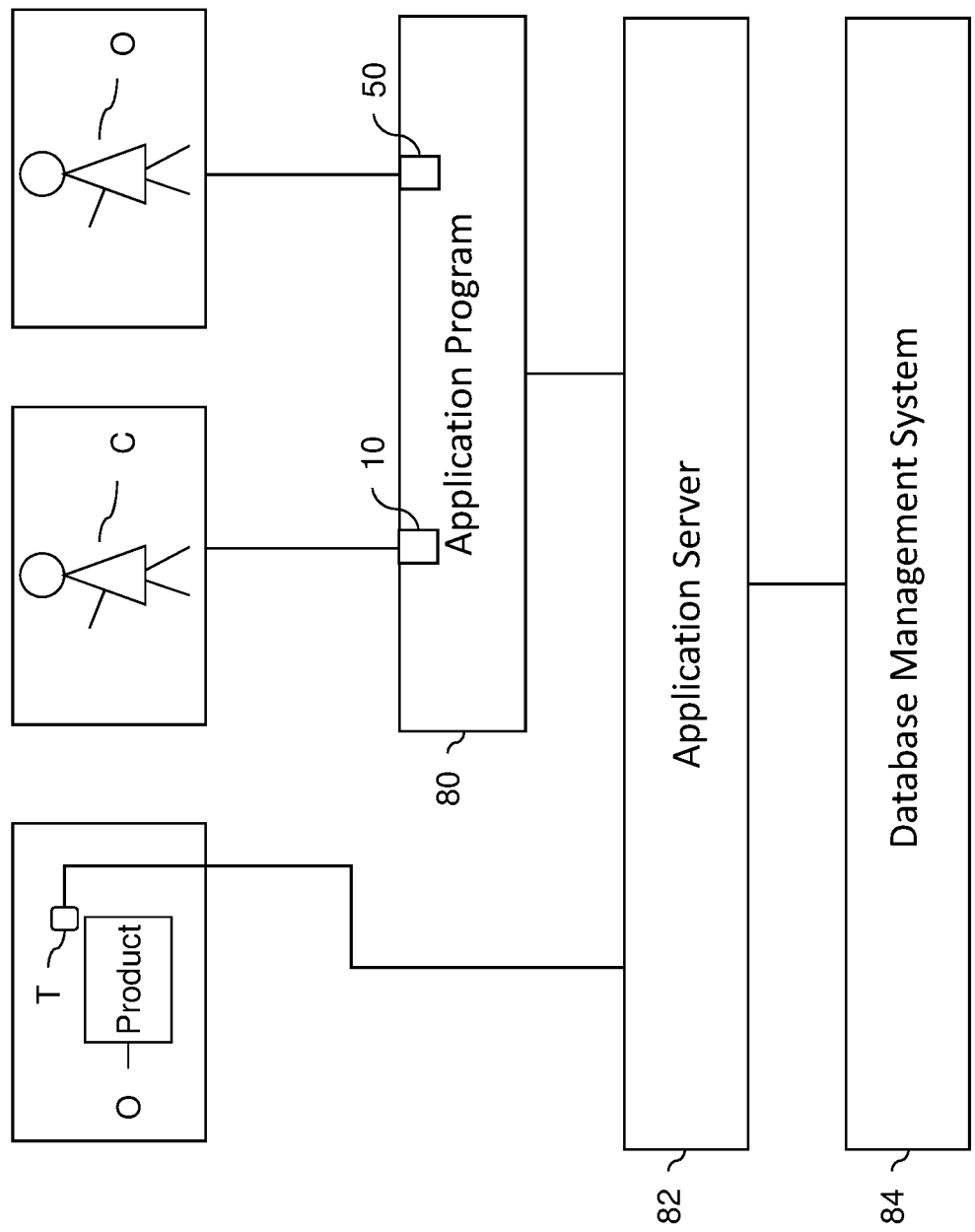
FIG. 7 shows an exemplary functional block diagram of the software layers according to the present disclosure.

FIG. 7 shows an exemplary functional block diagram of the software layers according to the present disclosure.

A user such as a customer C may operate a mobile device 10 on which one or more application programs 80 run to perform the functionalities described heretofore, in particular with reference to FIGS. 4 and 5. A user such as a shop owner O may operate a mobile device 50 on which one or more application programs 80 run to perform the functionalities described heretofore, in particular with reference to FIG. 6.

The application program(s) 80 may communicate with an application server 82, which may be part of the server device 20. An application server 82 may be deployed on premises or in a cloud environment. The tags T may also communicate with the application server 82.

The application server 82 may provide an interface between the tags T and mobile devices 10, 50 on one side and a database management system 84 on the other side, wherein the database management system 84 may also be part of the server device 20. The database management system 84 may manage one or more databases, such as the object information database 40. The database management system 84 may be implemented as described in "The SAP HANA Database—An Architecture Overview", Franz Farber, et al., 2012.

The examples of the system described above with reference to FIGS. 1 to 7 may provide the above-stated advantages for any process that involves information of a plurality of objects and requires support for the customer as well as the retailer or any other party involved in the process.

What is claimed is:

1. A system for providing and/or collecting information relating to at least one object, the system comprising:
   a radio-frequency identification, RFID, tag that is provided proximate to the at least one object, the RFID tag being configured to enable detection of a position and/or a movement of the at least one object;
   a server device configured to receive position and/or movement data about the at least one object; and
   a mobile device configured to:
   identify the at least one object;
   send a request to the server device for object information about the identified at least one object;
   wherein:
   the server device is further configured to, in response to the request, provide to the mobile device targeted object information about the identified at least one object, the targeted object information being at least partially based on the position and/or movement data;
   the mobile device is further configured to display the targeted object information;
   wherein the at least one object includes a plurality of objects located in an environment and the server device is further configured to:
   store the position and/or movement data about the plurality of objects; and
   process the position and/or movement data to obtain values of aggregate indicators relative to a predefined amount of time; and
   wherein the system further includes an additional mobile device configured to display the values of the aggregate indicators superimposed on a spatial representation of the environment.

2. The system of claim 1, wherein:
   the system further comprises one or more detection devices configured to interact with the RFID tag in order to enable detection of a position of the object; and/or
   the RFID tag comprises one or more motions sensors.

3. The system of claim 2, wherein the position and/or movement data comprise an indication that the at least one object is located in a check-out area and the targeted object information comprises indications about a check-out action.

4. The system of claim 3, wherein:
   the RFID tag is further configured to provide a theft prevention function; and
   the mobile device is further configured to:
   elicit a payment of the at least one object; and
   if the payment of the at least one object has been made, cause the theft prevention function of the RFID tag to be disabled.

5. The system of claim 4, wherein the targeted object information comprises a route from the at least one object to a secondary object and the mobile device is further configured to provide real-time guidance along the route.

6. The system of claim 5, wherein the mobile device is further configured to provide additional information about one or more additional objects located along the route.

7. A computer-implemented method for providing and/or collecting information relating to at least one object, the method comprising:
   providing the at least one object with a radio-frequency identification, RFID, tag that enables detection of a position and/or a movement of the at least one object;
   detecting the position and/or the movement of the at least one object;
   receiving, by a server device, position and/or movement data about the at least one object;
   identifying, by a mobile device, the at least one object;
   sending, by the mobile device, a request to the server device for object information about the identified at least one object;
   providing, by the server device, targeted object information about the identified at least one object to the mobile device, the targeted object information being at least partially based on the position and/or movement data;
   displaying, by the mobile device, the targeted object information;
   wherein the at least one object comprises a plurality of objects located in an environment and the method further includes:
   storing, by the server device, the position and/or movement data about the plurality of objects;
   processing, by the server device, the position and/or movement data to obtain values of aggregate indicators relative to a predefined amount of time; and
   displaying, by an additional mobile device, the values of the aggregate indicators superimposed on a spatial representation of the environment.

8. The method of claim 7, wherein displaying, by the mobile device, the targeted object information comprises using augmented reality.

9. The method of claim 8, wherein the position and/or movement data comprise an indication that the at least one object is located in a check-out area and the targeted object information comprises indications about a check-out action.

10. The method of claim 9, wherein the RFID tag further provides a theft prevention function and the method further comprises:
    eliciting, by the mobile device, a payment of the at least one object; and
    if the payment of the at least one object has been made, disabling the theft prevention function of the RFID tag.

11. The method of claim 10, wherein the targeted object information comprises a route from the at least one object to a secondary object and the method further comprises providing, by the mobile device, real-time guidance along the route.

12. The method of claim 11, wherein the method further comprises providing, by the mobile device, additional information about one or more additional objects located along the route.

13. A system comprising:
    a processor; and
    a memory coupled to the processor, the memory encoding one or more programs to cause the processor to:
    provide at least one object with a radio-frequency identification tag that enables detection of a position and/or a movement of the at least one object;
    detect the position and/or the movement of the at least one object;
    receive position and/or movement data about the at least one object;
    receive a request for object information about the identified at least one object;
    provide targeted object information about the identified at least one object to the mobile device, the targeted object information being at least partially based on the position and/or movement data;
    wherein the at least one object includes a plurality of objects located in an environment and the memory encodes one or more programs to cause the processor to:

store the position and/or movement data about the plurality of objects; and process the position and/or movement data to obtain values of aggregate indicators relative to a predefined amount of time.

14. The system of claim 13, wherein the targeted object information comprises augmented reality information.

15. The system of claim 14, wherein the position and/or movement data comprise an indication that the at least one object is located in a check-out area and the targeted object information comprises indications about a check-out action.

16. The system of claim 15, wherein the radio-frequency identification tag further provides a theft prevention function and the memory encodes one or more programs to cause the processor to:

disable, if payment of the at least one object has been made, the theft prevention function of the radio-frequency identification tag.

17. The system of claim 16, wherein the targeted object information comprises a route from the at least one object to a secondary object.

* * * * *